US006504908B1

(12) United States Patent
Bellomo et al.

(10) Patent No.: US 6,504,908 B1
(45) Date of Patent: Jan. 7, 2003

(54) REMINDER PHONE

(75) Inventors: Michael Bellomo, Millis, MA (US);
Alan Brav, Beverly, MA (US); Martin Henderson, Wayland, MA (US);
William MacIver, Hyde Park, MA (US); Richard M. Reich, Westwood, MA (US)

(73) Assignee: Lifeline Systems, Inc., Framingham, MA (US)

( * ) Notice: Subject to any disclaimer, the term of this patent is extended or adjusted under 35 U.S.C. 154(b) by 0 days.

(21) Appl. No.: 09/271,556

(22) Filed: Mar. 18, 1999

Related U.S. Application Data

(60) Provisional application No. 60/078,555, filed on Mar. 19, 1998.

(51) Int. Cl.[7] ............................................. H04M 11/04
(52) U.S. Cl. ............................. 379/38; 379/39; 379/40
(58) Field of Search ........................ 379/67.1, 69, 74, 379/75, 88.12, 88.22, 88.23, 88.24, 32.01, 33, 35, 37, 38, 39, 40, 41, 42, 43, 44, 48; 455/404; 340/539, 573.1

(56) References Cited

U.S. PATENT DOCUMENTS

| 4,064,368 A | * | 12/1977 | Dibner |
| 4,302,752 A | | 11/1981 | Weitzler .................. 340/309.1 |
| 4,303,801 A | * | 12/1981 | Anderson et al. |
| 4,524,243 A | * | 6/1985 | Shapiro |
| 4,565,902 A | * | 1/1986 | Phillipps |
| 4,839,749 A | * | 6/1989 | Franklin ...................... 360/12 |
| 5,157,640 A | | 10/1992 | Backner ...................... 368/10 |
| 5,287,398 A | | 2/1994 | Briault ........................ 379/38 |
| 5,305,370 A | | 4/1994 | Kearns et al. ................. 379/45 |
| 5,416,466 A | | 5/1995 | Malvaso et al. ............. 340/539 |
| 5,438,607 A | | 8/1995 | Przygoda, Jr. et al. ........ 379/38 |
| 5,521,589 A | * | 5/1996 | Mondrosch et al. ... 340/825.36 |
| 5,555,536 A | * | 9/1996 | Rolf et al. ..................... 369/19 |
| 5,612,869 A | | 3/1997 | Letzt et al. .................. 395/203 |
| 5,646,912 A | | 7/1997 | Cousin ........................ 368/10 |
| 5,648,760 A | * | 7/1997 | Kumar .................. 340/825.25 |
| 5,708,627 A | * | 1/1998 | Gormley ...................... 368/10 |
| 5,890,061 A | * | 3/1999 | Timm et al. ................. 455/404 |
| 5,892,442 A | * | 4/1999 | Ozery ......................... 340/539 |
| 5,905,436 A | * | 5/1999 | Dwight et al. ........... 340/573.1 |
| 6,044,257 A | * | 3/2000 | Boling et al. ............... 455/404 |

* cited by examiner

*Primary Examiner*—Scott L. Weaver
(74) *Attorney, Agent, or Firm*—Weingarten, Schurgin, Gagnebin & Lebovici LLP

(57) ABSTRACT

The present invention provides a personal emergency response system having a home communicator with fully integrated capabilities to provide messages and reminders on a timed basis for the well being, safety and comfort of the subscriber as well as providing the emergency response capabilities of present systems. The invention may be embodied in a small tabletop device which can include a speakerphone and other telephone functions and which is plugged into the telephone line at the subscriber's home or other facility. The unit includes microprocessor-based circuitry including an internal clock and data storage for containing control and message information. Data storage can be via a digital storage chip such as an EPROM. The invention serves as an interactive attendant for the subscriber by which the subscriber can have an increased sense of security in the ability to summon help in the event of an emergency, and in being provided with timely reminders in the course of daily activities.

19 Claims, 8 Drawing Sheets

REMINDER PHONE

CROSS REFERENCE TO RELATED APPLICATIONS

This application claims priority under 35 U.S.C. §119(e) to provisional patent application serial No. 60/078,555 filed Mar. 19, 1998; the disclosure of which is incorporated herein by reference.

STATEMENT REGARDING FEDERALLY SPONSORED RESEARCH OR DEVELOPMENT

Not Applicable

BACKGROUND OF THE INVENTION

Personal emergency response systems (PERS) are known by which a subscriber can communicate with a remote center in response to an emergency condition. One such system is known as the LIFELINE system and includes a home communicator having a speakerphone and coupled to a telephone line. The subscriber can actuate the home communicator to cause the automatic dialing of a central response center to signify an emergency condition. The response center can attempt to speak with the subscriber over the speakerphone and can also summon appropriate help to respond to the emergency call. Actuation of the communicator can be by a control button on the communicator as well as remotely via a wireless control worn by the subscriber. The communicator provides periodic reminders to the subscriber in response to which the subscriber must actuate a reset button to signify receipt of the reminder. In the absence of a response to the reminder, the communicator causes dialing of the response center and report of the missed response.

Apparatus is also known for providing timed reminders to a user to take pills or other medications at prescribed times. These type of devices are similar to alarm clocks times. These type of devices are similar to alarm clocks in that an alarm is sounded at a predetermined time to indicate to the user a need to take some type of action in response to the alarm.

BRIEF SUMMARY OF THE INVENTION

The present invention provides a personal emergency response system having a home communicator with fully integrated capabilities to provide messages and reminders on a timed basis for the well being, safety and comfort of the subscriber as well as providing the emergency response capabilities of present systems.

The invention may be embodied in a small tabletop device which can include a speakerphone and other telephone functions and which is plugged into the telephone line at the subscriber's home or other facility. The unit includes microprocessor-based circuitry including an internal clock and data storage for containing control and message information. Data storage can be via a digital storage chip such as an EPROM.

In a preferred embodiment of the invention, greeting messages are stored in memory in a voice familiar to the subscriber. Reminders are also stored in memory for selected purposes such as medication reminders, reminders to perform particular medical tests, reminders to call certain individuals, etc. The invention also contemplates the maintenance of information for reordering of medications or other items.

The invention serves as an interactive attendant for the subscriber by which the subscriber can have an increased sense of security in the ability to summon help in the event of an emergency, and in being provided with timely reminders in the course of daily activities.

Reminders can be provided on a daily, weekly or other periodic basis, and can also be provided on a one-time basis. The system can also include a video interface to provide visual as well as audible interaction via a telephone link. The invention can also include temperature monitoring via a temperature sensor and provide an alarm announcement or other indication in the event of temperature falling outside of normal limits. The system may also be coupled to a smoke alarm to provide an alarm indication in the event of smoke detection.

The system may also include an attendance-tracking feature by which home care personnel must log in such as via the telephone keypad or by other personal identification. The system stores the login time and identification of the attendant. The system may also be embodied in a separate unit that is connectable to a PERS system and/or to a telephone. This separate unit may be portable and pluggable into a telephone jack or into a cell phone.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

Figure 1A:
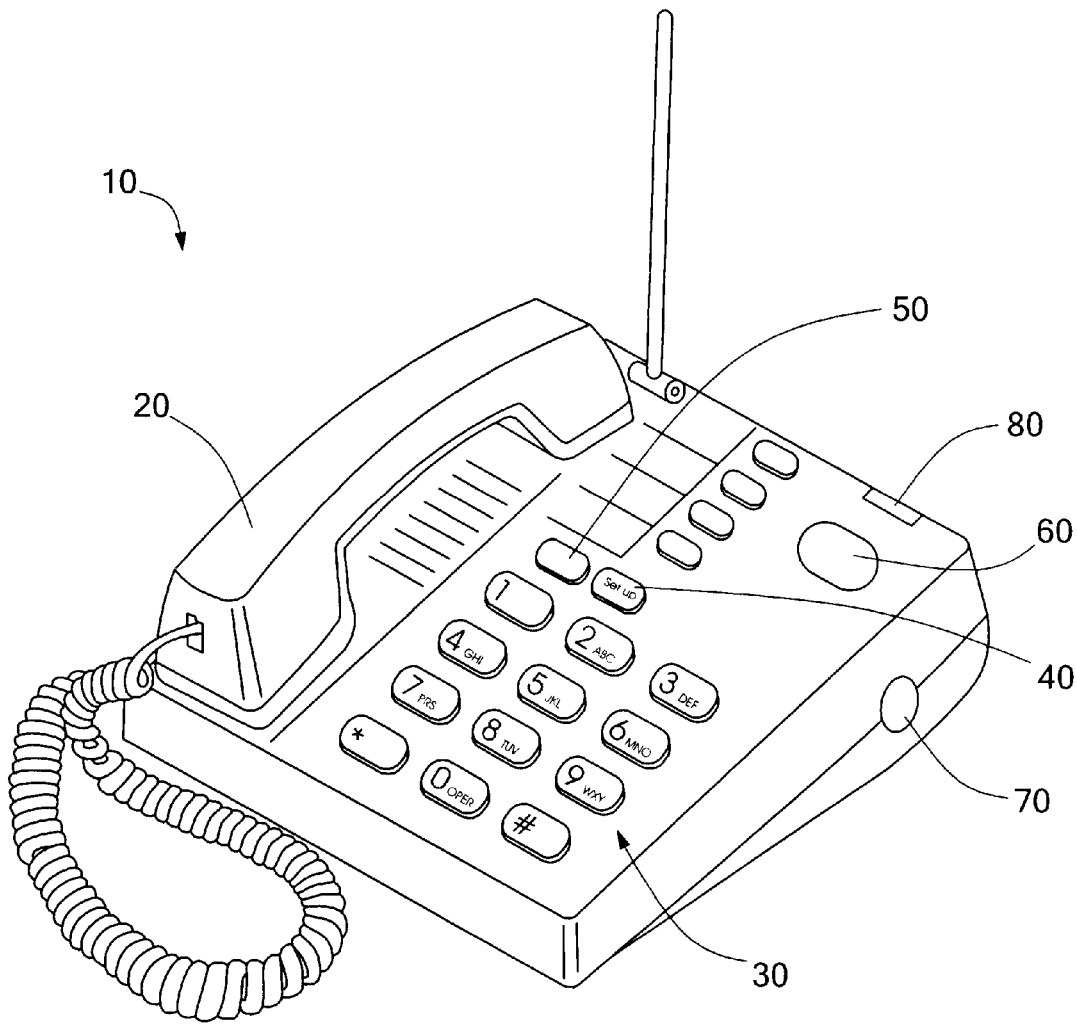
FIG. 1A is a perspective view of the reminder phone of the present invention.

Referring to FIG. 1A a reminder phone 10 is shown. The reminder phone 10 includes a handset 20 for communication when the device is used as a telephone and a numeric keypad 30 for dialing phone numbers as known from traditional telephones. The reminder phone further includes a speakerphone key 50 to allow for communication without using the handset 20.

A HELP key 70 is provided which, when pressed, attempts to report an alarm condition to an Emergency Response Center (ERC). A RESET key 60 is provided which terminates a call once the call has been responded to, triggers an inactivity alarm if not pressed within a predetermined time interval, and is used to hear the stored message once the reminder has initiated.

The SETUP key 40 is used for setting up or programming personal reminders. The personal reminders can be programmed locally by use of the numeric keypad 30 or can be done remotely via the phone, such as from a caregiver's home, a doctor's office, or other remote locations. Reminders can be programmed to play once a day (daily), once a week (weekly) or to play only once.

The daily reminders will play at the same time every day. This is useful to remind the user of daily activities which should occur at the same time every day, such as taking medications, waking, performing physical therapy or exercises or even watching a favorite daily television program. The weekly reminders will play once a week on the set day at the set time. Weekly reminders are useful for reminding the user of weekly activities such as religious services, weekly television programs or nurse visits. The one-time reminder will play only once at the set day and at the set time. The one-time reminder is useful for events that do not repeat at a predictable interval, such as a doctor's visit.

The reminder can be recorded in the user's own voice and as such provides a friendly reassuring message to the user. The reminder could alternatively be recorded in the voice of a relative or caregiver to provide the same type of reassuring reminder. The reminders are stored locally in the reminder phone, thus the reminder will still occur even if the phone line becomes inactive. The reminder phone could be realized as a wireless phone or as a cellular phone. In this instance the user could take the phone with him/her while moving about in and out of the home while still being able to be reminded of programmed events.

In the event that an alarm is missed, the alarm triggers a call to an Emergency Response System, since a missed alarm could be indicative that the user may be in a distress situation.

The reminder phone can be used as an attendance checking system. The user is required to check in once a day to signify that they are all right. If the user fails to check in, this failure to check in triggers a call to the Emergency Response Center wherein a person may be dispatched to check on the condition of the user. The reminder phone can additionally be programmed to track an inventory of a medication, and to reorder medication when supplies have reached a threshold limit or to reorder on a scheduled basis. Additionally, requests can be phoned in to a doctor's office to either receive a new prescription or to report error results.

The reminder phone can provide additional safety to subscribers by being coupled with a temperature monitor and/or a smoke alarm. The temperature monitor would trigger an alarm condition when the temperature at the subscriber's residence exceeded a predetermined threshold. The alarm would alert a third party to check on the condition of the subscriber. The temperature monitor alarm would indicate a warning situation if the temperature drops below a low temperature threshold. Similarly, the smoke alarm would also trigger an alarm condition upon the identification of smoke, and inform the third party of a potential emergency condition requiring immediate attention.

Figure 1B:
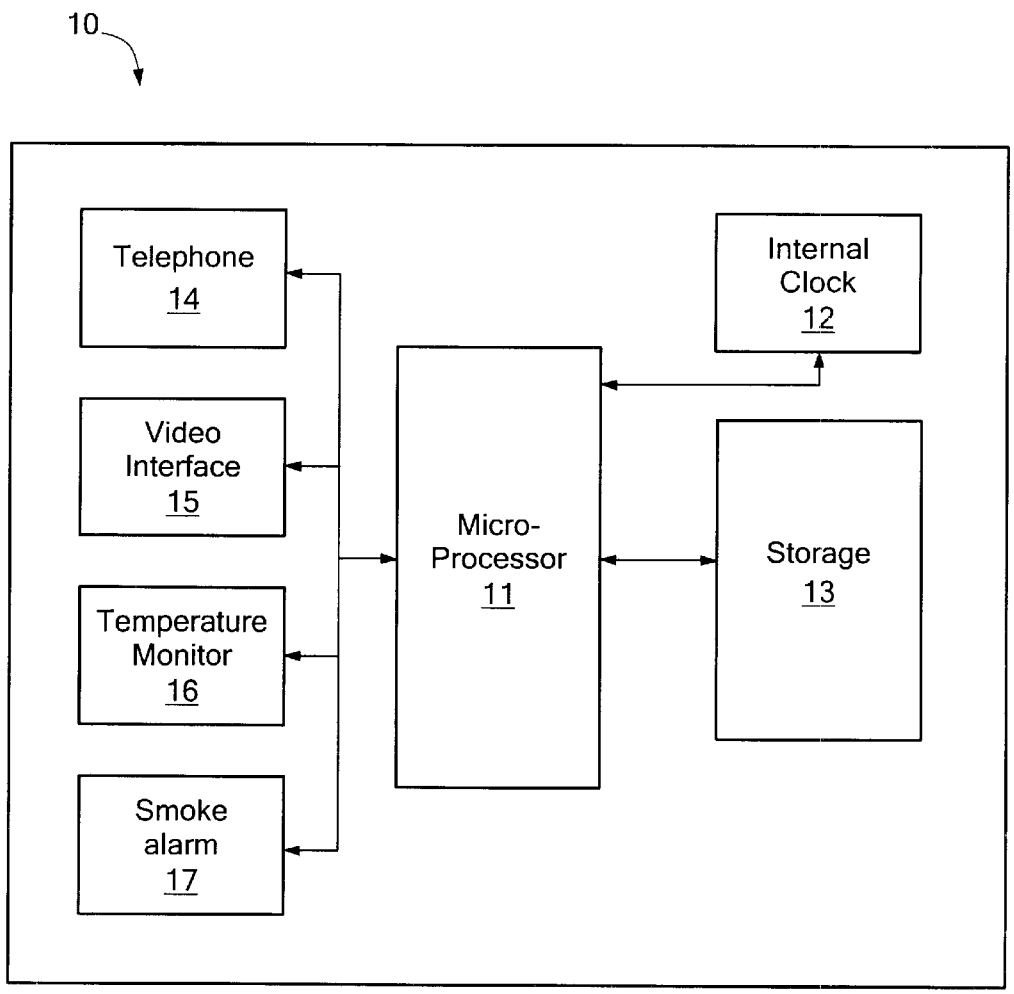
FIG. 1B is a block diagram of the reminder phone of FIG. 1A.
Figure 2A:
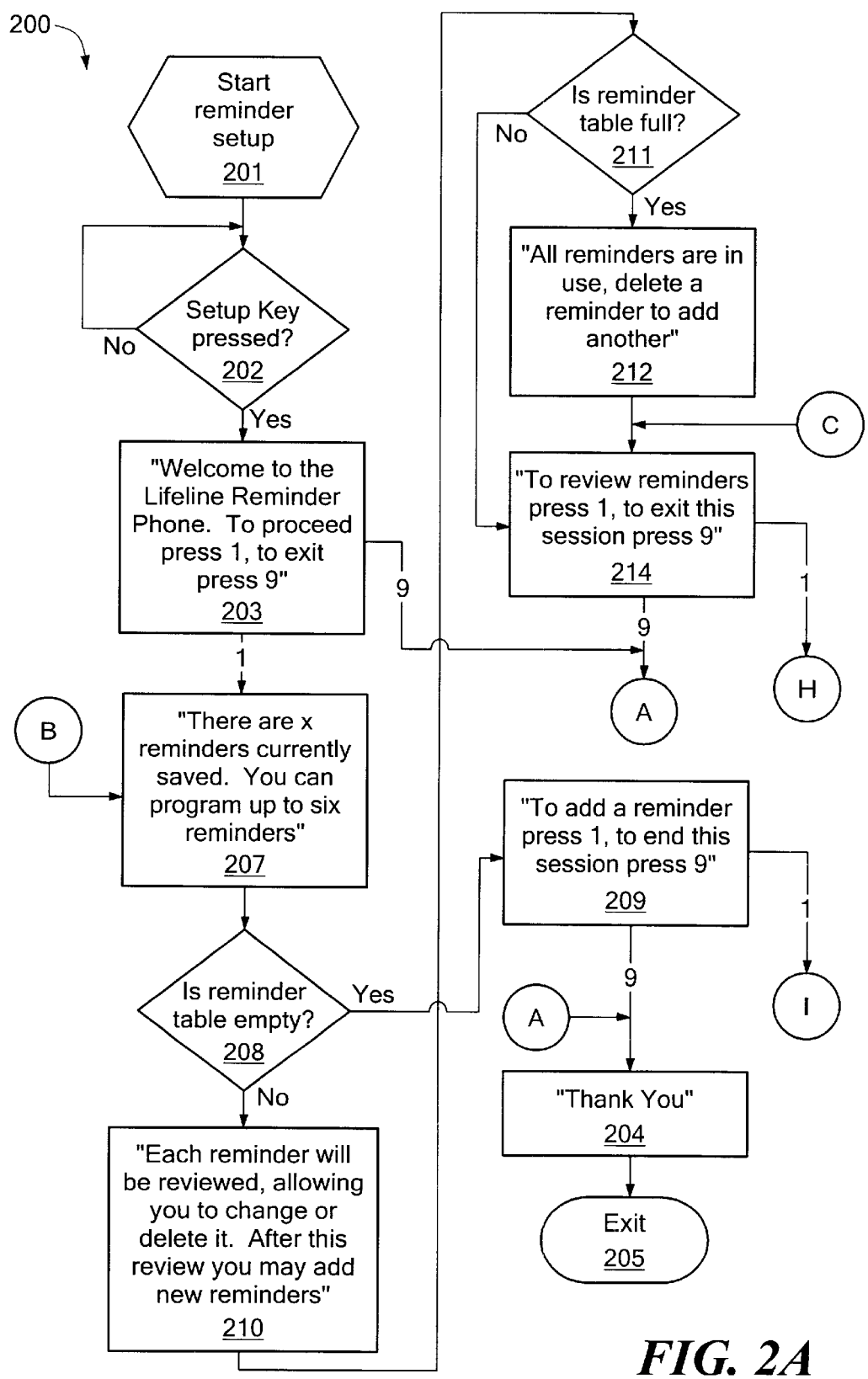
FIG. 2A is a first portion of a flow chart for programming the reminder phone of the present invention.
Figure 2B:
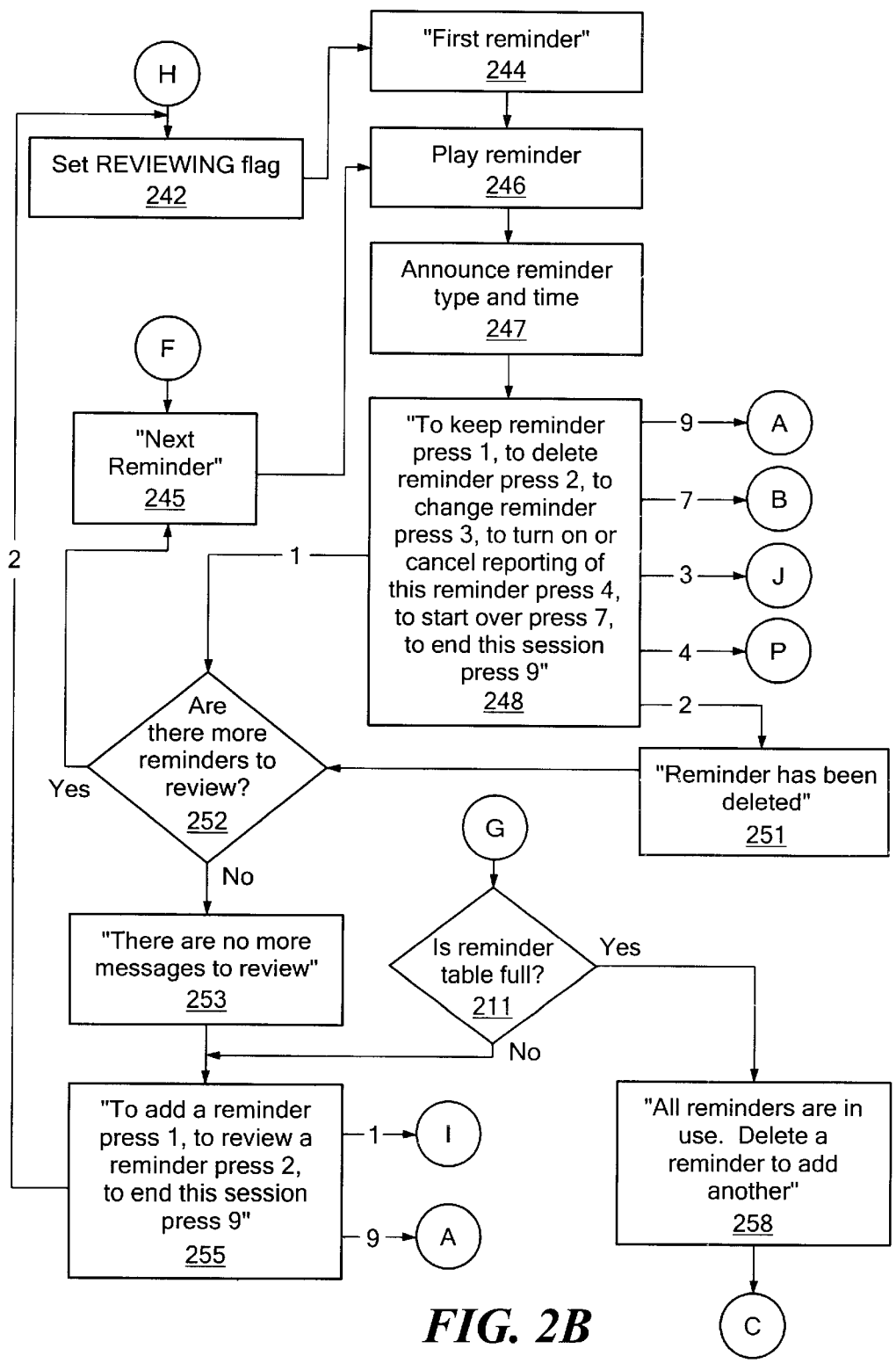
FIG. 2B is a second portion of a flow chart for programming the reminder phone of the present invention.
Figure 2C:
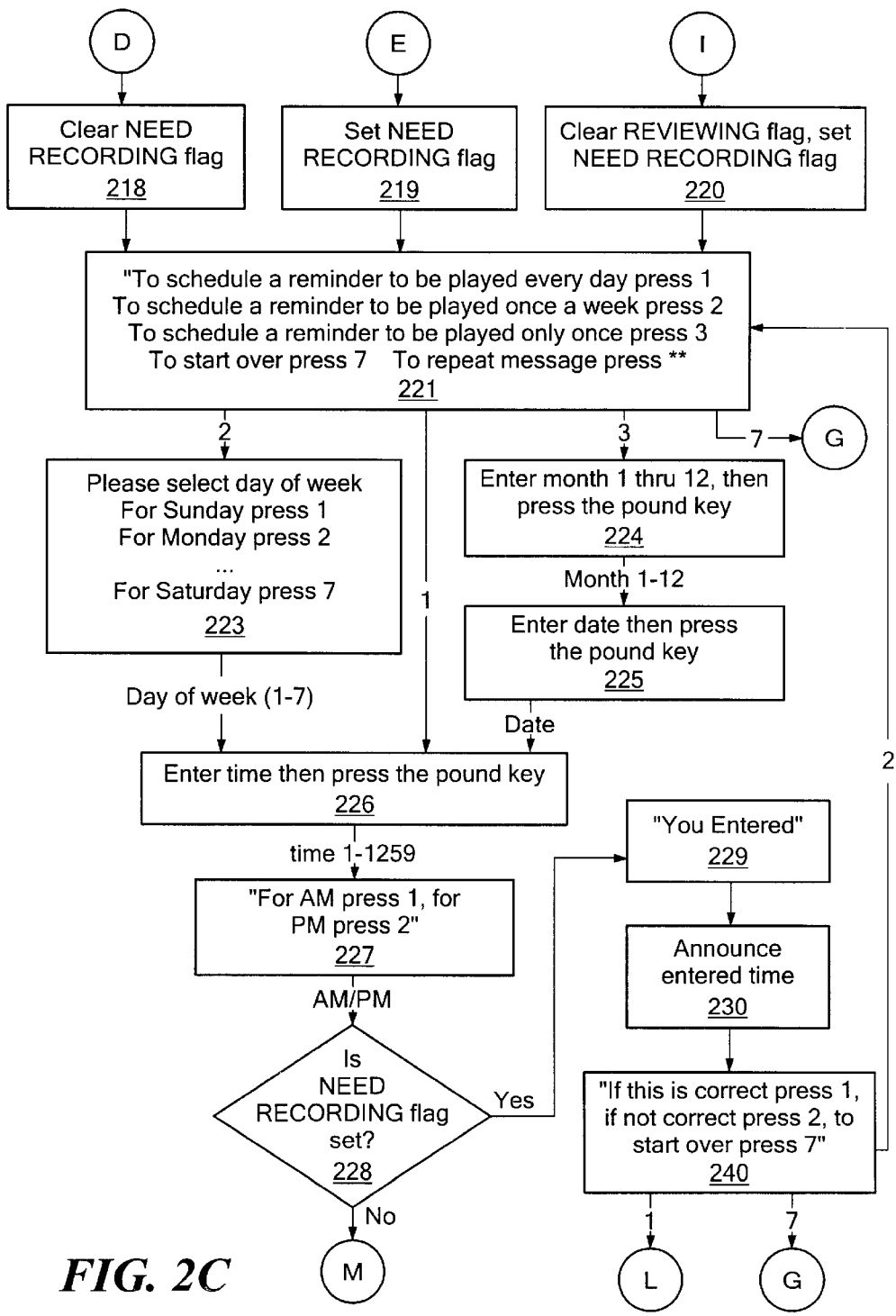
FIG. 2C is a third portion of a flow chart for programming the reminder phone of the present invention.
Figure 2D:
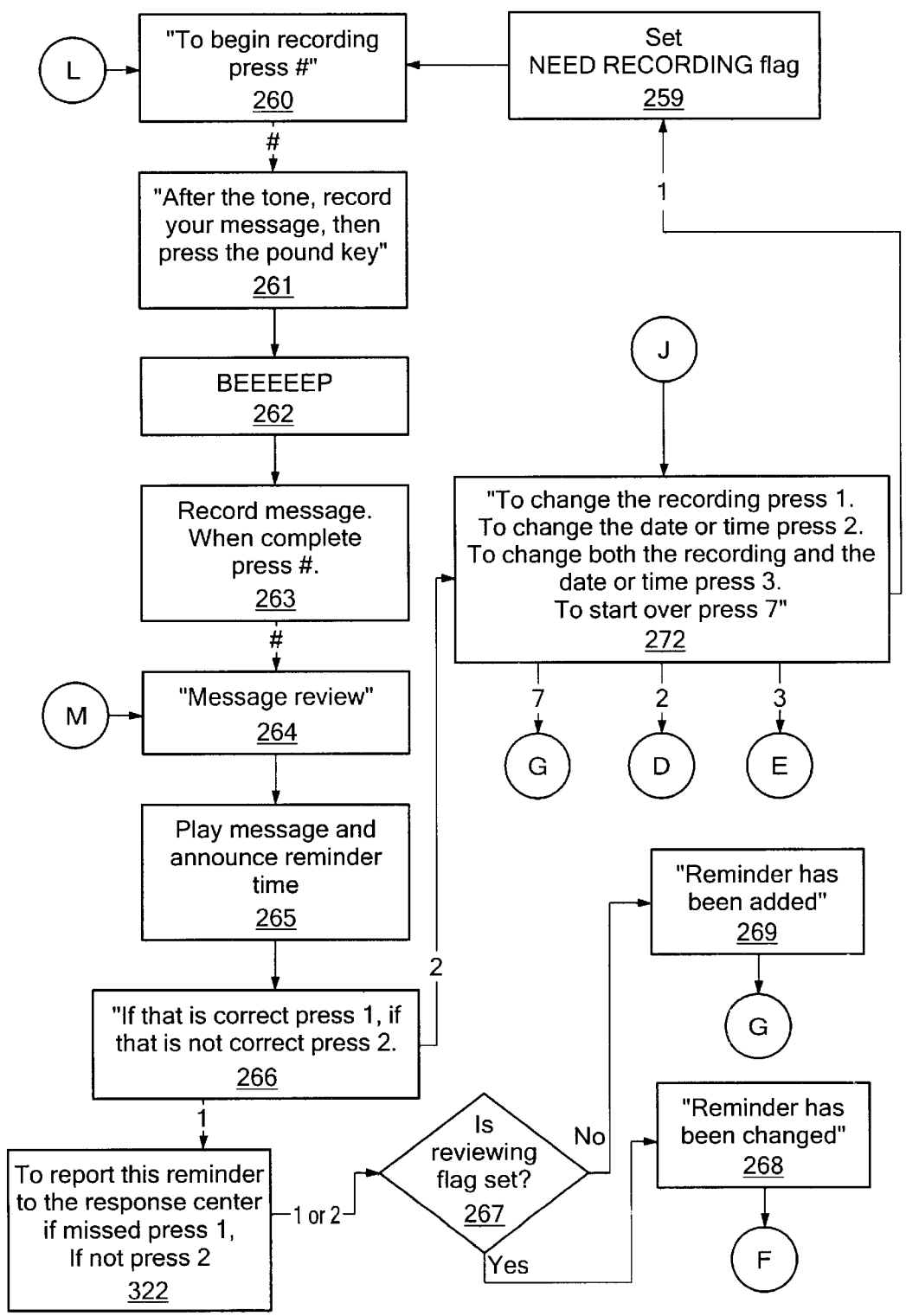
FIG. 2D is a fourth portion of a flow chart for programming the reminder phone of the present invention.

Referring now to FIG. 1B, a block diagram of the reminder phone 10 is shown. Reminder phone 10 includes a microprocessor 11 in communication with an internal clock 12. Microprocessor 11 is also in communication with storage 13. Storage 13 contains control and message information and may be realized as a digital storage device such as an Erasable Programmable Read Only Memory (EPROM). A telephone 14 is also shown in communication with the microprocessor 11, as are a variety of interfaces. These interfaces include a video interface 15, a temperature monitor 16 and a smoke alarm 17.

Referring now to FIGS. 2A–2D, a flow chart for the process 200 for programming reminders into the Reminder Phone is shown. At step 201 the reminder set up process begins. The first step is to determine if the set up key is pressed, as shown in step 202. If the setup key has not been pressed, then the process loops, waiting for the set up key to be pressed. Once the setup key has been pressed, step 203 is executed. At step 203 an introductory message is played directing the user to press numeric keypad key 9 to exit the program (in the case where the setup key was pressed inadvertently) or to press keypad key 1 to proceed. If the user presses keypad key 9, then an exit message is played to the user as shown in step 204, and the process terminates shown in step 205.

Referring back to step 203, upon the pressing of numeric keypad key 1 step 207 is executed wherein the user is prompted regarding the number of currently saved reminders and the maximum number of reminders that can be saved. At step 208 a determination is made if the reminder table is empty. If the table is empty, then step 209 is executed wherein the user may exit the program by pressing keypad key 9 thereby executing steps 204 and 205 or, if keypad key 1 is pressed steps 220 et seq. are executed. Referring back to step 208, if the remainder table is not empty the user is prompted that each reminder will be reviewed during which the pending reminders can be changed or deleted after which new reminders can be added as shown in step 210. At step 211 a determination is made as to whether the reminder table is full. Next, at step 212, if the reminder table is full then the user is prompted that all reminders are in use and that a reminder must be deleted in order to add another. After completion of step 212 or if the reminder table is not full, step 214 is executed which prompts the user to press keypad key 1 to review pending reminders or to press keypad key 9 to exit. If keypad key 9 is pressed then executing steps 204 and 205 terminates the process. If keypad key 1 is pressed then step 242 is executed.

At step 242 a REVIEWING flag is set. At step 244 the user is made aware that the first reminder is about to be played. Following this step, step 246 is executed wherein the first reminder is played for the user. After the reminder is played, the reminder type and time are indicated to the user, as shown in step 247.

At step 248 the user is presented with several options. The user is instructed to press 1 to keep the reminder in its current state, to press 2 to delete the reminder, to press 3 to change the reminder to press 7 to start over or to press 9 to end the session.

If the user presses a 1, step 252 is executed wherein a determination is made as to whether there are more reminders to review. If there are, then steps 245 et seq. are executed. If not, then step 253 is executed wherein the user is prompted that there are no more messages to review. Step 255 is executed next wherein the user is directed to press 1 to add a reminder, press 2 to review a reminder or to press 9 to end the session. If a 1 is pressed then step 220 et seq. are executed. If a 2 is pressed, then steps 242 et seq. are executed. If a 9 is pressed, then steps 204 and 205 are executed.

Referring back to step 248, if a 2 is pressed, then step 251 is executed wherein the user is notified that the reminder has been deleted. Steps 252 et seq. are then executed.

When a 3 is pressed in response to step 248 steps 272 et seq., described below, are executed. If a 7 is pressed steps 207 et seq. are executed and if a 9 is pressed steps 204 and 205 are executed.

To change a reminder step 272 is executed. Step 272 directs a user to press 1 to change a recording, to press 2 to change the date or time, to press 3 to change both the recording and the date or time and to press 7 to start over. When a 1 is pressed at step 272, step 259 is executed wherein the NEED RECORDING flag is set. Step 260 is then executed wherein the user is directed to press the # key to begin recording. The user is directed to record the message after the tone and then to press the pound key, as shown at step 261. The tone is sounded at step 262 and the message recorded at step 263. A message review is initialized at step 264. At step 265 the message is played and the reminder time is announced. At step 266 the user is directed to press a 1 if the message and time are correct, or to press a 2 if the message and time are not correct. If a 1 is pressed, steps 267 et seq., are executed. At step 267 if the reviewing flag is set step 268 et seq. are executed. If the reviewing flag is not set, step 269 et seq. are executed. referring back to step 266, if a 2 is pressed then step 272 is executed.

When a 2 is pressed in response to step 272, step 218 is executed wherein the NEED REVIEWING flag is cleared. Step 221, described below, is then executed. When a 3 is pressed in response to step 272, step 219 is executed wherein the NEED RECORDING flag is set. Step 221 is then executed. When a 7 is pressed, steps 256 et seq. are executed. At step 256 a determination is made regarding the reminder table. IF the reminder table is full, then step 258 is executed wherein the user is notified that all the reminders are in use, and that a reminder must be deleted in order to add another reminder. The user then executes steps 214 et seq. described above. If the reminder table is not full at step 256, then step 255 et seq., described earlier, are executed.

Step 221 prompts a user to schedule a reminder. To schedule a daily reminder the user is directed to press a 1 wherein steps 226 et seq., described in detail below, are executed.

When the user desires to schedule a weekly reminder, the user is directed to press 2 wherein step 223 is executed. Step 223 directs the user to select a day of the week by pressing a corresponding keypad key, then to enter the time as directed at step 226. Next, as shown at step 227, the user presses a 1 for AM or a 2 for PM. Next, at step 228 a determination is made if the NEED RECORDING flag is set. If not, steps 264 et seq. are executed. If the NEED RECORDING flag is set, steps 229, 230 and 240 are executed wherein the entered time is announced and the user directed to press a 1 if this is correct, a 2 if this is not correct or a 7 to start over. If a 1 is pressed, steps 260 et seq., are executed, if a 2 is pressed steps 221 et seq. are executed, and if a 7 is pressed steps 256 et seq., are executed.

Referring back to step 221, if a 3 is pressed, the user is directed to enter the month at step 224 and then the date at step 225. Steps 226 et seq. are then executed.

Figure 3A:
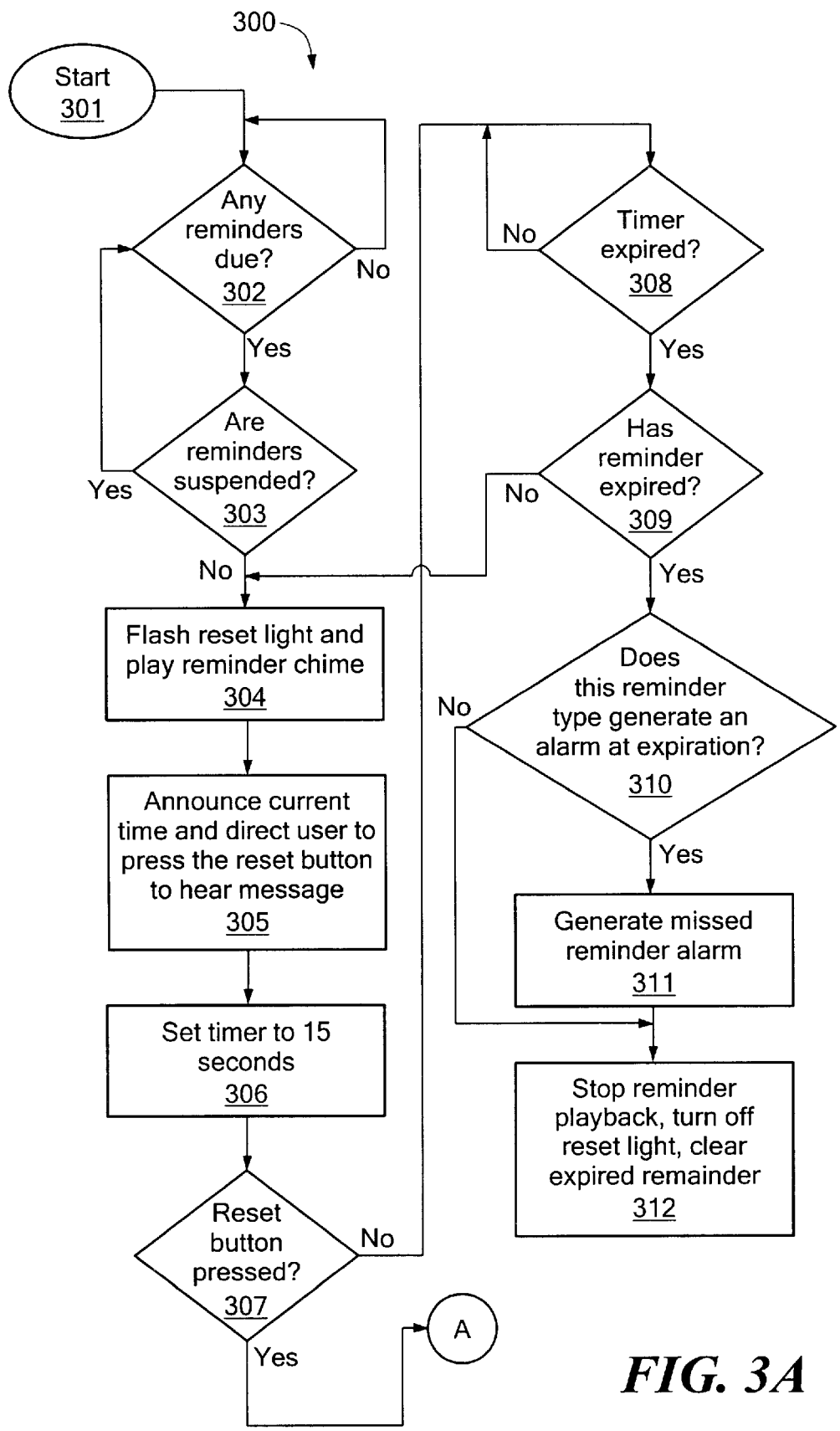
FIG. 3A is a first portion of a flow chart of the playback process for the reminder phone of the present invention.
Figure 3B:
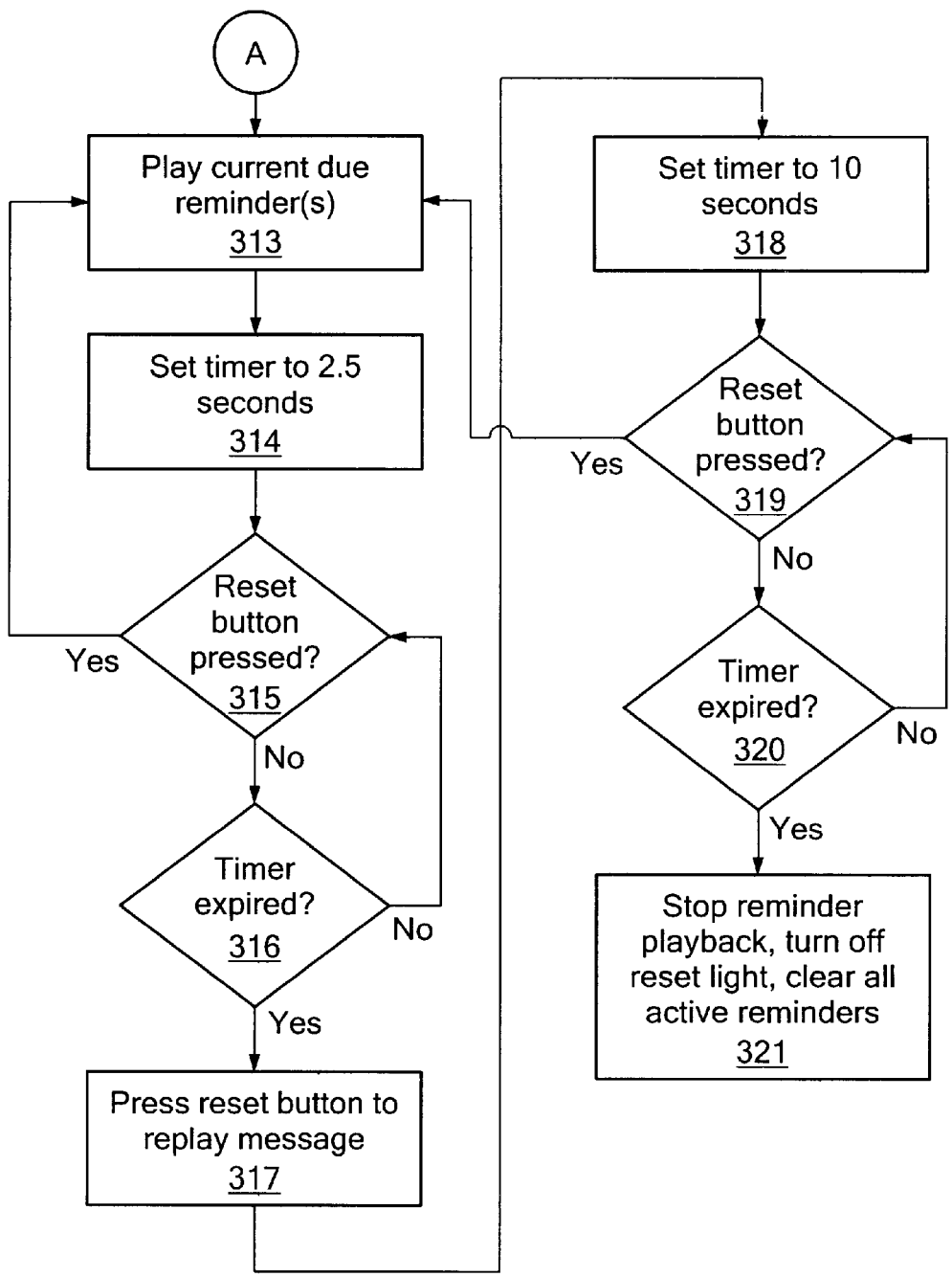
FIG. 3B is a second portion of a flow chart of the playback process for the reminder phone of the present invention.

Referring now to FIGS. 3A and 3B, a flow chart for the process 300 for the playback of reminders is shown. At a first step 302 a check is determined if any reminders are due. If no reminders are currently due, then the determination is repeated until a reminder is due. Once a reminder is due, step 303 is performed. At step 303 a determination is made as to whether any reminders are suspended. Reminders may be suspended for example, if the subscriber will be away for a period of time during which the reminder would be active. Other events which will result in reminders being suspended include the handset being off-hook, an incoming call is in progress, reminders are being reviewed or added, or if an alarm is currently active. If the reminders have been suspended, then a check regarding whether any reminders are due is reiterated as shown at step 302. If the reminders have not been suspended then the reset light is flashed, and the reminder chime played as shown in step 304. The next step 305 announces the current time followed by instructions to press the reset button to hear the reminder message. Following this, a timer is set to run for 15 seconds, shown in step 306. At step 307, a determination is made if the reset button has been pressed. If the reset button has not been pressed, and the timer has expired, step 308, then a determination is made as to whether the reminder has expired. If the reminder has not expired, then steps 304 through 309 are repeated again. If the reminder has expired then, as shown in step 310, if the reminder is of the type to generate an alarm, the missed reminder alarm is generated, shown in step 311. After the missed reminder alarm is generated, or if the reminder type does not generate an alarm, step 312 is executed which stops the reminder playback, stops flashing the reset light and clears the expired reminder.

Referring back to step 307, if the reset button is pressed, then the current reminder is played, shown in step 313. At step 314 a timer is set to run for 2.5 seconds. As shown in steps 315 and 316 if the reset button is pressed before the timer has expired the current reminder is played again. Once the timer expires, as shown in step 317, the user is prompted if he or she would like to repeat the message. A timer is set to run for 10 seconds, step 318, and if the reset button is pressed before the timer expires, steps 319 and 320, the message is repeated as shown in step 313 et seq. Once the timer expires without the reset button being pressed, step 321 is execute. At step 321 the reminder playback is stopped, the reset light is turned off and all active reminders are cleared.

The above described invention provides a personal emergency response system having a home communicator with fully integrated capabilities to provide messages and reminders on a timed basis for the well being, safety and comfort of the subscriber as well as providing the emergency response capabilities of present systems. The reminder messages are stored in memory in a voice familiar to the subscriber. Reminders are also stored in memory for selected purposes such as medication reminders, reminders to perform particular medical tests, reminders to call certain individuals, etc. as well as providing timely information for reordering of medications or other items. The invention serves as an interactive attendant for the subscriber by which the subscriber can have an increased sense of security in the ability to summon help in the event of an emergency, and in being provided with timely reminders in the course of daily activities. The reminders can be provided on a daily, weekly or other periodic basis, and can also be provided on a one-time basis.

Having described preferred embodiments of the invention it will now become apparent to those of ordinary skill in the art that other embodiments incorporating these concepts could also be utilized. Accordingly, it is submitted that the present invention should not be limited to the described embodiments but rather should be limited only by the spirit and scope of the appended claims.

We claim:

1. An apparatus for providing reminders comprising:
a microprocessor under program control;
an internal clock in communication with said microprocessor;
storage in communication with said microprocessor, wherein said microprocessor, said internal clock and said storage are co-operative (i) to store a reminder message having an expiration time, (ii) to play the reminder message to a user at a predetermined time, and (iii) to detect a response of the user prior to the expiration of the reminder message;

a telephone in communication with said microprocessor; and a personal emergency response system in communication with said telephone and said microprocessor, wherein said microprocessor triggers an alarm for activating said personal emergency response system if said reminder message expires without said microprocessor detecting a response thereto.

2. The apparatus of claim 1 wherein said reminder message is played once.

3. The apparatus of claim 1 wherein said reminder message is played daily.

4. The apparatus of claim 1 wherein said reminder message is played weekly.

5. The apparatus of claim 1, wherein the reminder message comprises a verbal reminder message.

6. The apparatus of claim 1 wherein said apparatus is programmed remotely.

7. The apparatus. of claim 1 further comprising a video interface in communication with said microprocessor.

8. An apparatus according to claim 1, further comprising a temperature monitor in communication with said microprocessor, and wherein said microprocessor and said temperature monitor are operative to indicate an emergency situation if said temperature monitor reads a temperature outside predetermined temperature bounds.

9. An apparatus according to claim 1, further comprising a smoke alarm in communication with said microprocessor, and wherein said microprocessor and said smoke alarm are operative to indicate an emergency situation if the presence of smoke is detected.

10. The apparatus of claim 1 wherein said microprocessor, said internal clock and said storage are operative to suspend a reminder message.

11. The apparatus of claim 10 wherein said microprocessor, said internal clock and said storage are operative to resume a suspended reminder message.

12. The apparatus of claim 1 wherein said microprocessor, said internal clock and said storage are operative to provide a plurality of reminder messages to a user at respective predetermined times.

13. The apparatus of claim 1 wherein said telephone comprises a speakerphone.

14. The apparatus of claim 1 wherein said telephone comprises a cordless phone.

15. The apparatus of claim 1 wherein said telephone comprises a cellular phone.

16. The apparatus of claim 10 wherein said reminder message is suspended during an event selected from the group consisting of a handset being off-hook, an incoming call, a reminder message is being reviewed, a reminder message is being added, and an alarm is triggered for activating said personal emergency response system.

17. The apparatus of claim 5 wherein said verbal reminder message is played in a user's own voice.

18. The apparatus of claim 1 wherein said apparatus is programmed locally.

19. An apparatus for providing reminders comprising:

a microprocessor under program control;

an internal clock in communication with said microprocessor;

storage in communication with said microprocessor and wherein said microprocessor, said internal clock and said storage are operative to provide a reminder to a user at a predetermined time;

a telephone in communication with said microprocessor; and a personal emergency response system in communication with said telephone and said microprocessor, wherein said microprocessor, said internal clock and said storage are operative to require a user to login periodically and wherein absence of a login is indicative of a condition requiring attention and activating said personal emergency response system.

* * * * *